United States Patent
Chaudhry

(10) Patent No.: US 10,345,006 B2
(45) Date of Patent: Jul. 9, 2019

(54) PULSED POWER-BASED DRY FIRE PROTECTION FOR ELECTRIC WATER HEATERS

(71) Applicant: Rheem Manufacturing Company, Atlanta, GA (US)

(72) Inventor: Raheel A. Chaudhry, Montgomery, AL (US)

(73) Assignee: RHEEM MANUFACTURING COMPANY, Atlanta, GA (US)

( * ) Notice: Subject to any disclaimer, the term of this patent is extended or adjusted under 35 U.S.C. 154(b) by 449 days.

(21) Appl. No.: 15/172,233

(22) Filed: Jun. 3, 2016

(65) Prior Publication Data

US 2016/0282013 A1 Sep. 29, 2016

Related U.S. Application Data

(62) Division of application No. 13/938,964, filed on Jul. 10, 2013, now Pat. No. 9,377,342.

(60) Provisional application No. 61/678,704, filed on Aug. 2, 2012.

(51) Int. Cl.
*F24H 9/20* (2006.01)
*G01F 23/24* (2006.01)
*H05B 1/02* (2006.01)

(52) U.S. Cl.
CPC ........... *F24H 9/2021* (2013.01); *G01F 23/24* (2013.01); *G01F 23/247* (2013.01); *H05B 1/0283* (2013.01)

(58) Field of Classification Search
CPC ...... G01F 23/24; G01F 23/247; F24H 9/2021; H05B 1/0283

USPC ........................................................ 392/451
See application file for complete search history.

(56) References Cited

U.S. PATENT DOCUMENTS

| | | | | |
|---|---|---|---|---|
| 3,012,126 A * | 12/1961 | Ferguson | ........... | G05D 23/2237 219/494 |
| 3,586,830 A * | 6/1971 | Leitner | ................... | D02J 13/00 219/497 |
| 3,637,984 A * | 1/1972 | Irvine | ................ | G05D 23/1913 219/471 |
| 4,039,928 A * | 8/1977 | Noftsker | ................ | B23K 11/25 219/494 |
| 4,053,733 A * | 10/1977 | Murata | .............. | G05D 23/1913 219/494 |
| 4,223,207 A * | 9/1980 | Chow | ....................... | G05F 1/66 219/482 |
| 4,745,263 A * | 5/1988 | Brooks | ............... | B29C 65/3444 156/273.9 |

(Continued)

FOREIGN PATENT DOCUMENTS

WO  WO 2002/053988  12/2002

*Primary Examiner* — Eric S Stapleton
(74) *Attorney, Agent, or Firm* — King & Spalding LLP

(57) ABSTRACT

A water heater having an electric heating element therein is provided with apparatus for preventing dry firing of the heating element. The apparatus is operative to (1) power the heating element with electrical test pulses having first predetermined durations and being separated by rest periods of second predetermined durations during which the heating element is depowered, (2) determine the average electrical current flow through the element during each of the test pulses, and (3) preclude energization of the heating element if the average current flow therethrough during an electrical test pulse subsequent to the first test pulse is less by a predetermined magnitude than the average electrical current flow through the heating element during the first electrical test pulse.

20 Claims, 4 Drawing Sheets

(56) References Cited

U.S. PATENT DOCUMENTS

| | | | | |
|---|---|---|---|---|
| 5,421,943 A * | 6/1995 | Tam | ............... | B23K 20/023 |
| | | | | 156/273.9 |
| 5,831,250 A * | 11/1998 | Bradenbaugh | ..... | G05D 23/1909 |
| | | | | 219/497 |
| 6,363,218 B1 * | 3/2002 | Lowenstein | ......... | H05B 1/0283 |
| | | | | 392/498 |
| 6,455,820 B2 | 9/2002 | Bradenbaugh | ........ | F24H 9/2007 |
| | | | | 219/481 |
| 6,649,881 B2 * | 11/2003 | Scott | ............... | A47J 31/56 |
| | | | | 219/481 |
| 7,209,651 B1 * | 4/2007 | Knoeppel | ............. | F24H 9/2021 |
| | | | | 219/482 |
| 7,236,692 B2 * | 6/2007 | Tran | ............... | H05B 1/0269 |
| | | | | 219/492 |
| 7,372,005 B2 * | 5/2008 | Knoeppel | ............... | C23F 13/04 |
| | | | | 204/195.06 |
| 7,706,670 B2 * | 4/2010 | Knoeppel | ............. | F24H 9/2021 |
| | | | | 392/441 |
| 7,957,885 B2 * | 6/2011 | Kernwein | ............. | F02P 19/022 |
| | | | | 123/145 A |
| 8,126,320 B2 * | 2/2012 | Cartwright | ............. | F24H 1/202 |
| | | | | 392/451 |
| 9,100,994 B2 * | 8/2015 | Orawetz | ................ | B64D 15/12 |
| 2002/0125241 A1 * | 9/2002 | Scott | ...................... | A47J 31/56 |
| | | | | 219/492 |
| 2007/0210067 A1 * | 9/2007 | Patterson | ............. | F24H 9/2014 |
| | | | | 219/481 |
| 2009/0199569 A1 * | 8/2009 | Petrenko | ................ | B64D 15/12 |
| | | | | 62/3.1 |
| 2011/0233189 A1 * | 9/2011 | Reiss | ................... | B60H 1/2218 |
| | | | | 219/492 |
| 2014/0037274 A1 * | 2/2014 | Chaudhry | ............... | G01F 23/24 |
| | | | | 392/451 |
| 2016/0282013 A1 * | 9/2016 | Chaudhry | ............... | G01F 23/24 |

* cited by examiner

PULSED POWER-BASED DRY FIRE PROTECTION FOR ELECTRIC WATER HEATERS

CROSS-REFERENCE TO RELATED APPLICATION

The present application is a divisional of U.S. patent application Ser. No. 13/938,964 entitled "Pulsed Power-Based Dry Fire Protection for Electric Water Heaters," filed Jul. 10, 2013, which claims the benefit of the filing date of provisional U.S. Patent Application No. 61/678,704 filed Aug. 2, 2012, the entire disclosures of which are hereby incorporated by reference.

BACKGROUND OF THE INVENTION

The present invention relates generally to dry fire protection for electric water heaters and, in a representative embodiment thereof, more particularly provides pulsed electrical power-based dry fire protection apparatus for liquid heating apparatus such as electric water heaters.

An electric water heater, like its fuel-fired counterparts, is typically sold without water in it and is filled with water after being moved to and installed in its intended operation location. The possibility exists that the water heater can be "dry fired"—i.e., have its electric resistance type heating element(s) energized before the storage tank portion of the water heater is filled with water to immerse the heating elements(s) projecting into its interior. When such dry firing occurs, each dry fired electric heating element typically burns out, resulting in a return of the unit to the manufacturer, or a service call by a repair technician to perform on-site element replacement.

The cost of either repair procedure can be quite substantial, and is often borne by the water heater manufacturer under its warranty policy for the water heater. There is accordingly a need for reducing warranty costs associated with dry firing of electric heating elements in a water heater. It is to this need that the present application is primarily directed.

DETAILED DESCRIPTION

Figure 1:
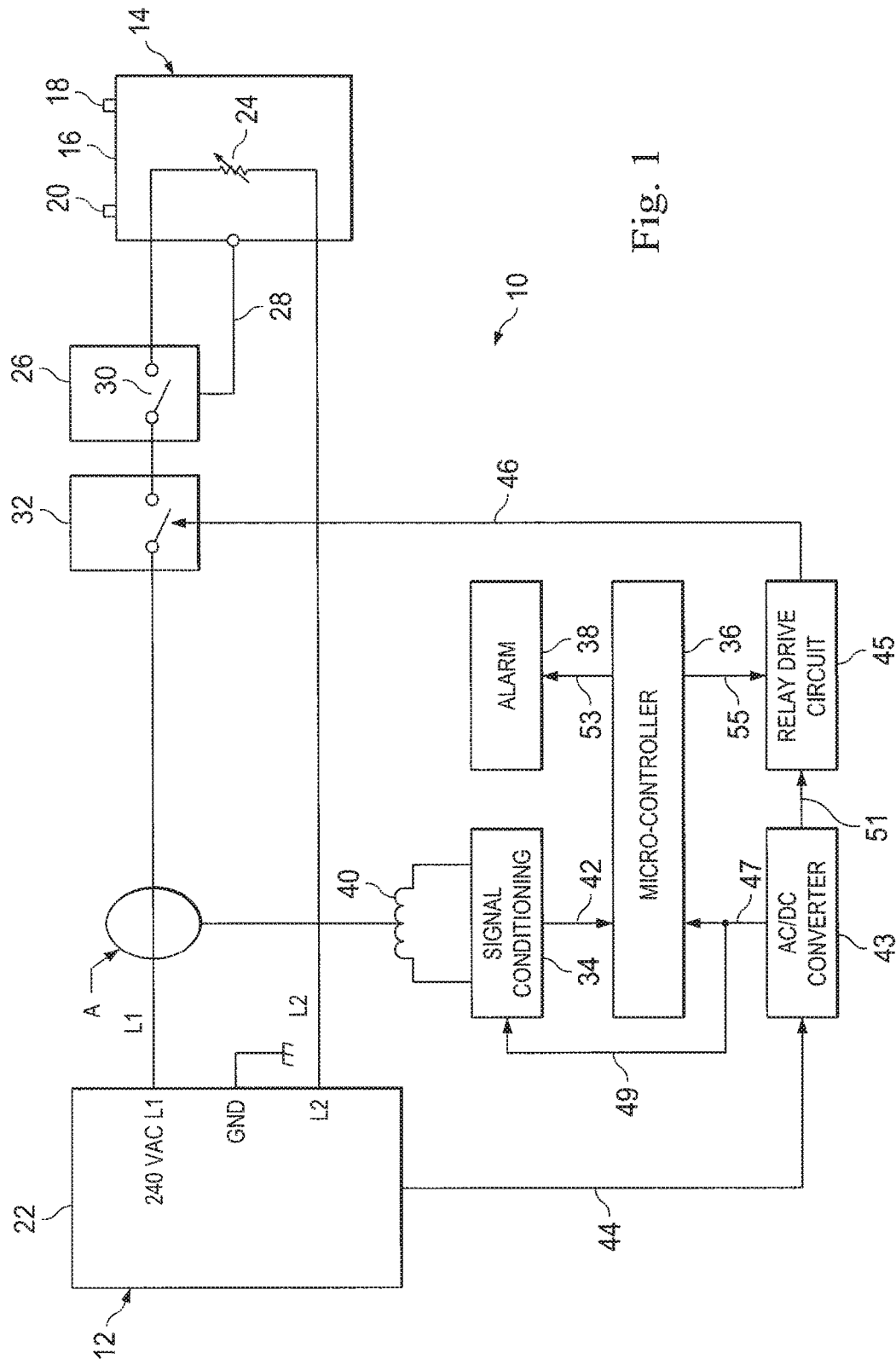
FIG. 1 is a schematic block diagram of a pulsed power-based dry fire protection system operatively connected to an illustrative electric water heater and embodying principles of the present invention.

With initial reference to FIG. 1, in an illustrative embodiment thereof the present invention provides specially designed dry fire protection apparatus 10 which may be operatively associated with the power circuit 12 of an illustrative electric water heater 14 (or other type of liquid heater using at least one electric liquid heating element) to prevent dry fire damage thereto. Water heater 14 includes the usual tank 16 within which a quantity of water to be heated and stored for on-demand delivery to various plumbing fixtures operatively connected thereto. Such heated water is discharged from the tank 16 through a tank outlet fitting 18, and automatically replaced with cold supply water, from a suitable pressurized source thereof, via a tank inlet fitting 20.

The power circuit 12 includes a grounded source 22 of high voltage AC electrical power which is operable, via leads L1 and L2, to selectively deliver electrical power to at least one electric heating element 24 disposed in the tank 16 and selectively energizable, by a thermostat 26 connected in the power circuit 12 as shown, to maintain the tank water at a predetermined set point temperature. In a conventional manner, the thermostat 26 continuously senses the tank water temperature, as schematically depicted by the lead 28, and is provided with a normally open switch portion 30 which is closed in response to sensing by the thermostat 26 of a tank water temperature below the set point temperature, and then permitted to re-open when the set point temperature is reached and the thermostat-sensed water heating demand is satisfied.

The dry fire protection apparatus or circuit 10 includes a relay 32 connected in lead L1 in series with the thermostat 26, a signal conditioning circuit 34, a pre-programmed microcontroller 36 and an alarm 38. Signal conditioning circuit 34 is coupled to electrical power lead L1, representatively at location A thereon, by a step-down current transformer/sensor portion 40 of the circuit 34, the transformer/sensor 40 illustratively having a 1000:1 winding ratio. As subsequently described herein, the signal conditioning circuit 34 outputs to the microcontroller 36 a low voltage DC electrical signal 42, the voltage of which is indicative of the alternating current passing through the water heater heating element 24. The dry fire protection system 10 further includes an AC/DC converter 43 and a relay drive circuit 45. AC/DC converter 43 receives AC voltage from the electrical power source 22 via power lead 44 and outputs DC electrical power to the microcontroller 36, the signal conditioning circuit 34, and the relay drive circuit 45 respectively via power leads 47, 49 and 51. Microcontroller 36 outputs control signals 53,55 respectively to the alarm 38 and the relay drive circuit 45, with relay drive circuit 45 outputting a control signal 46 to the relay 32 to selectively open and close the relay 32.

Figure 2:
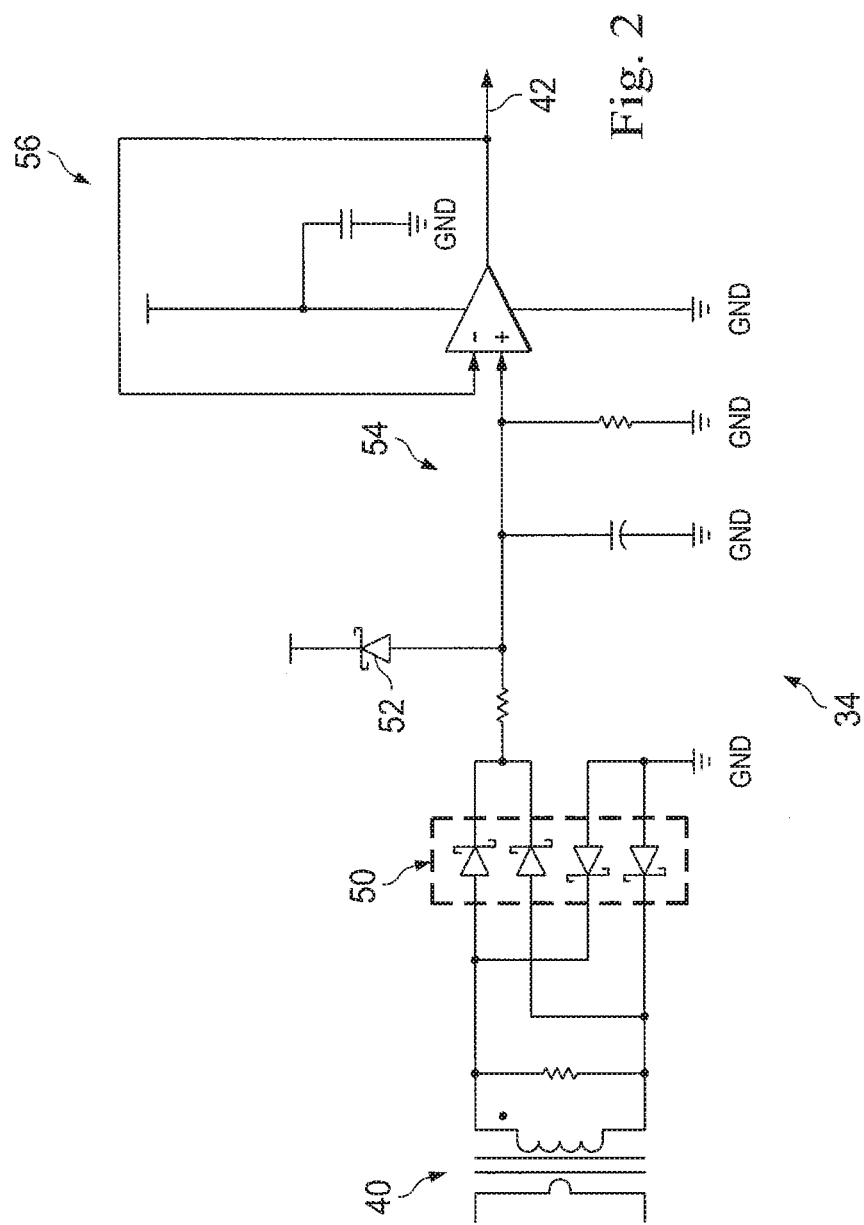
FIG. 2 is a schematic diagram of a signal conditioning circuit portion of the FIG. 1 dry fire protection system.

Turning now to FIG. 2, in the representatively illustrated embodiment thereof, in addition to the current transformer 40, the signal conditioning circuit 34 comprises, in a downward sequence from the transformer 40, an AC/DC rectifier section 50, a voltage limiting diode 52, a filter section 54, and an op/amp buffer circuit 56. As indicated in FIG. 2 and previously described herein, the signal conditioning circuit 34 is operative to output to the microcontroller 36 (see FIG. 1) the low DC voltage signal 42 (representatively up to 3.3V DC) which is indicative of the alternating current passing through the water heater heating element 24. Illustratively, the 3.3V DC conditioning circuit output signal 42 is digitized in such a manner that the 3.3 volts represents 1024 steps or counts, with each step or count representing a specific amount of current passing through the electric heating element 24. As will be readily appreciated by those of skill in this art, signal conditioning circuits of other constructions could alternatively be utilized without departing from principles of the present invention.

The microcontroller 36 is programmed to utilize its electrical current-representative input signal 42 (see FIGS. 1 and 2) to prevent dry firing of the electric heating element 24 using the representative logic shown in the schematic flow diagram of FIG. 3 which will now be described. In response to an initial start-up of the water heater 14 at step 60 (and the presence of a heating demand condition which closes the thermostat switch 30), a counter is set to zero at step 62, and the microcontroller 36, at step 64, momentarily closes the relay 32 and causes the electric heating element 24 to be energized with an AC test voltage for a predetermined short pulse period (illustratively one second) and increments the counter from zero to one.

Next, at step 66, the electrical test current flowing through the heating element 24 (represented by the input signal 42 to the microcontroller 36) is measured and an average current flow through the heating element 24 for the time (one second) the element was momentarily energized is calculated. At step 68 the heating element 24 is then de-energized for a predetermined rest period time (representatively for ten seconds) by permitting the relay 32 to return to its normally open position.

A transfer is then made to step 70 at which a query is made as to whether the counter value is "1". If it is, a transfer is made to step 72 at which the previously determined average current flow through the element 24 is saved as a "threshold" value and a transfer is made to step 78. If at step 70 the counter value is not "1", a transfer is made to step 74.

At step 74 a query is made as to whether the "average" element test current value (previously calculated at step 66) is less than the "threshold" test current value minus a predetermined current value (representatively 132 mA in "counts"). If the answer is yes, a dry fire condition has been detected and a transfer is made to step 76 at which the alarm 38 is activated and the relay 32 is kept in its normally open position to preclude energization voltage input to the heating element 24. If the answer to the query at step 74 is "no", a transfer is made to step 78 at which a query is made as to whether the counter value is greater than five. If the answer is "yes" a transfer is made to step 80 at which normal water heater operation is permitted to satisfy the thermostat-initiated water heating demand.

If the query answer at step 78 is "no", a transfer is made from step 78 back to step 64, whereupon steps 64-74 are repeated. If the query answer at step 74 is "no" six times in a row in a given dry fire test, and the query answer at step 78 then becomes "yes", a transfer is made from step 78 to step 80 at which the system has determined that a dry fire condition does not exist, and permits the operative energization of the electric heating element 24 to satisfy the water heating demand. However, if at any time in a given dry fire test the query answer at step 74 is "yes", operative energization of the heating element 24 is precluded at step 76 and the dry fire test is concluded.

Figure 3:
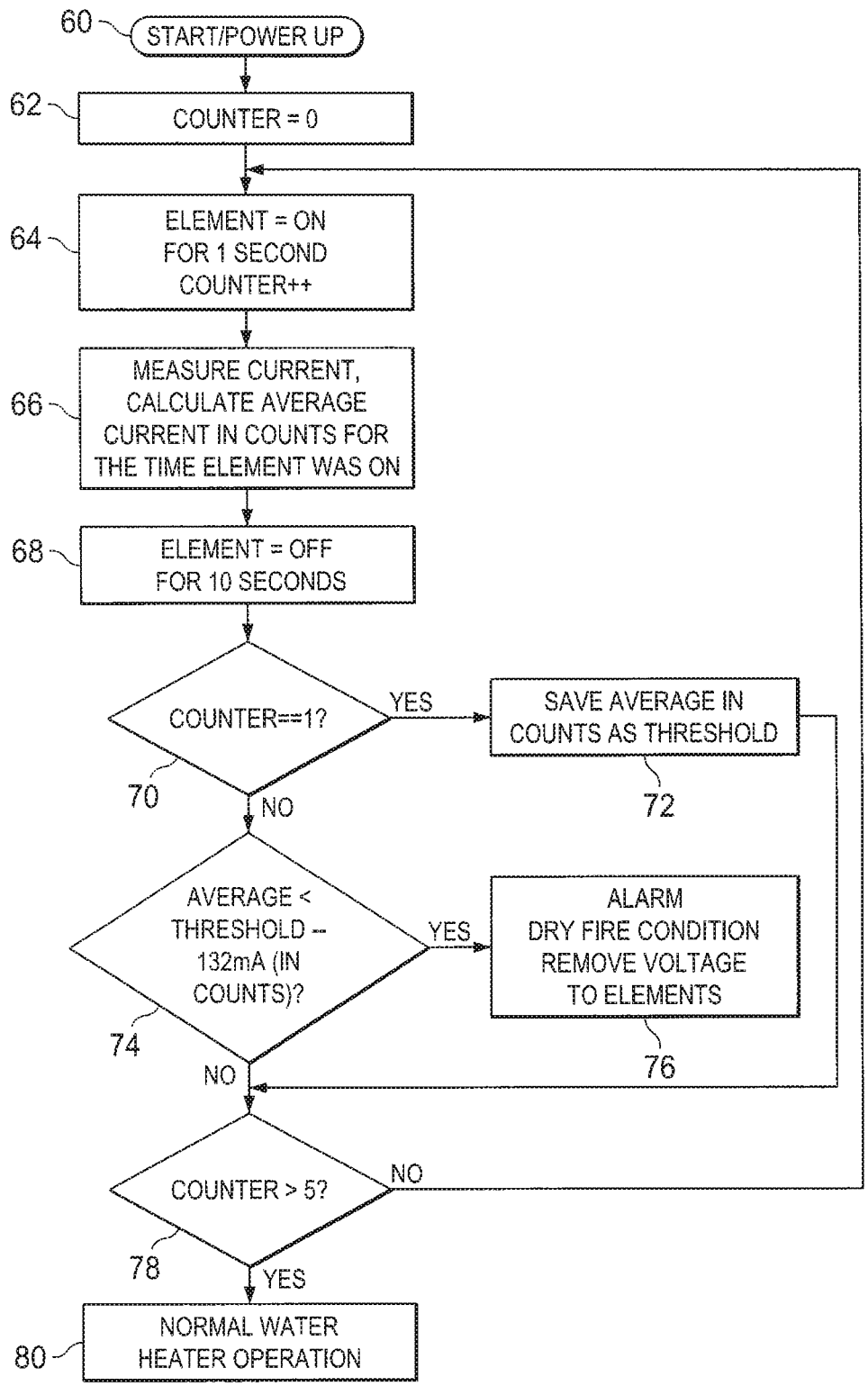
FIG. 3 is a logic flow diagram illustrating operation of the dry fire protection system.

As can be seen from the FIG. 3 logic flow chart, in an illustrated representative embodiment thereof the present invention provides a method for protecting a liquid heating apparatus electric heating element from being dry fired that, from a broad perspective, comprises measuring the current flowing through the heating element in a predetermined number of pulsed increments spaced apart by predetermined rest periods, determining the average current flow through the heating element during each current pulse, and preventing operational energization of the heating element if any of the determined average current flows through the element is less by a predetermined magnitude than a "threshold" value equal to the first pulse average current flow through the heating element.

Figure 4:
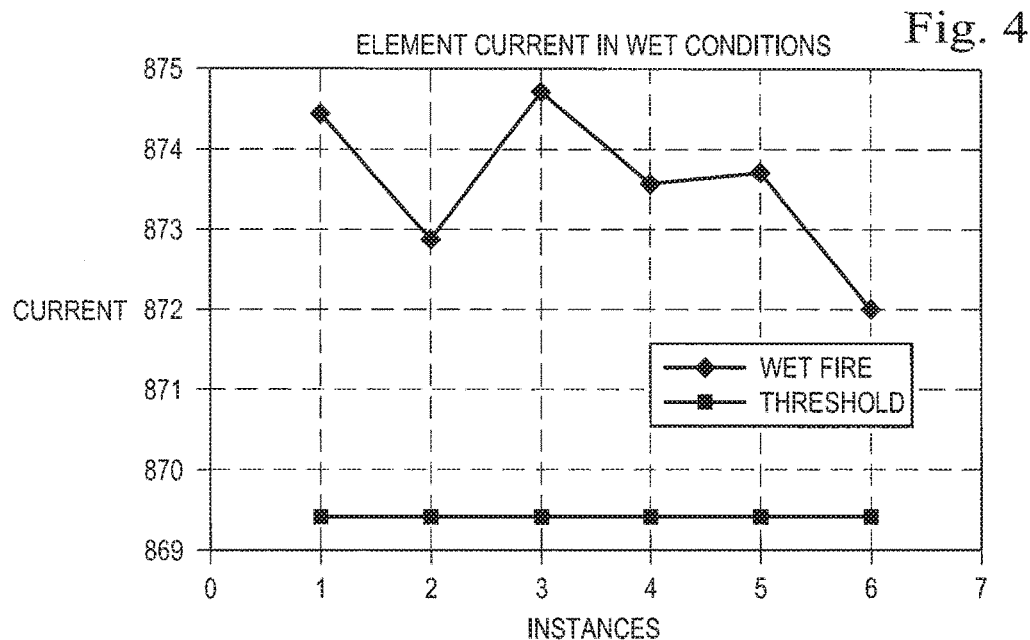
FIG. 4 is a graphical depiction of the current flow through the FIG. 1 electrical heating element when tested using the dry fire protection system during wet fire conditions.
Figure 5:
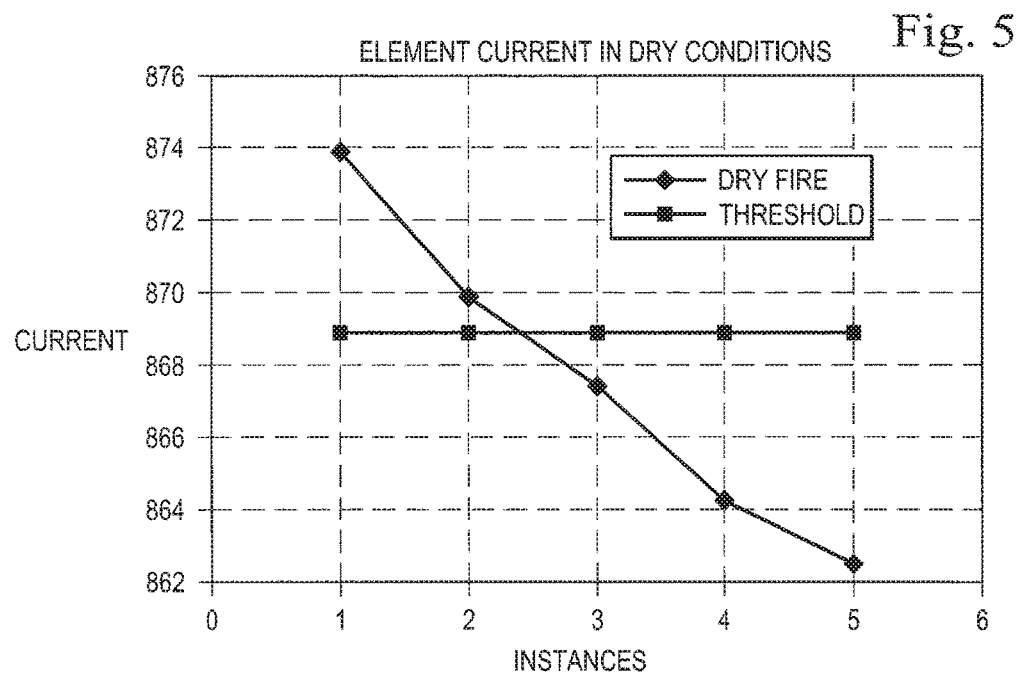
FIG. 5 is a graphical depiction of the current flow through the FIG. 1 electrical heating element when tested using the dry fire protection system during dry fire conditions.

To illustrate this current average-to-threshold current average comparison to determine when a dry fire condition exists, reference is now made to the graphs in FIGS. 4 and 5. FIG. 4 illustrates a non-dry fire test result in which each of the measured element current averages is above the threshold value, while in FIG. 5 the last three measured average element current flows are each below such threshold value to an extent indicating a dry fire condition.

As can be seen from the foregoing, dry fire testing of the element 24 provided by the present invention may be advantageously carried out without subjecting the element 24 to substantial sustained periods of test firing which are typically necessary when, for example, element temperature measurement is necessary to determine whether a dry firing condition exists. Moreover, the dry fire protection system is of a simple, reliable construction that may be readily associated with a heating element power circuit.

The foregoing detailed description is to be clearly understood as being given by way of illustration and example only, the spirit and scope of the present invention being limited solely by the appended claims.

What is claimed is:

1. A method of preventing dry firing of an electric heating element, comprising steps of:
    powering the electric heating element with a plurality of electrical test pulses having first predetermined durations and being separated by rest periods of second predetermined durations during which the electrical heating element is depowered;
    determining an average of a representative value corresponding to an electrical current flow through the electric heating element during each of the plurality of electrical test pulses; and
    precluding operative energization of the electric heating element if the average of the representative value corresponding to the electrical current flow through the electric heating element during an electrical test pulse subsequent to a first electrical test pulse is less by a predetermined amount than the average of the representative value corresponding to the electrical current flow through the electrical heating element during the first electrical test pulse.

2. The method of claim 1, further comprising disposing the electric heating element in an electric water heater tank operative to store a quantity of water to be heated.

3. The method of claim 1, wherein:
    the first predetermined durations are each approximately one second, and
    the second predetermined durations are each approximately ten seconds.

4. The method of claim 1, wherein:
    the electric heating element is incorporated in a liquid heating apparatus having an AC electrical power circuit in which the electric heating element and a relay are operatively connected, and
    the powering step includes alternately opening and closing the relay.

5. The method of claim 4, comprising a step of permitting the AC electrical power circuit to continuously energize the electric heating element, to satisfy a liquid heating demand of the liquid heating apparatus, when none of a predetermined number of the electrical test pulses subsequent to the first electrical test pulse has created in the electric heating element an average current flow less by the predetermined amount than the representative value corresponding to the electrical current flow through the electric heating element during the first electrical test pulse.

6. The method of claim 4, comprising a step of converting AC electrical power received from the AC electrical power circuit to a DC electrical output signal indicative of an average electrical current flow through the electric heating element during each of the plurality of electrical test pulses, and utilizing the DC electrical output signal in determining the average electrical current flow through the electric heating element during each of the plurality of electrical test pulses.

7. The method of claim 6, comprising a step of coupling a signal conditioning circuit to the AC electrical power circuit by a step-down current transformer, the signal conditioning circuit being operative to generate the DC electrical output signal.

8. The method of claim 1, wherein:
the powering step is performed using AC electrical power, and
the determining step includes a step of utilizing the AC electrical power to create a DC electrical signal indicative of the representative value corresponding to the electrical current flow through the electric heating element during each of the plurality of electrical test pulses.

9. The method of claim 8, wherein:
the AC electrical power is supplied from an AC electrical power circuit, and
the step of utilizing includes a step of coupling the AC electrical power circuit to a signal conditioning circuit operative to output the DC electrical signal.

10. The method of claim 9, wherein:
the step of coupling is performed using a step-down current transformer.

11. The method of claim 9, comprising a step of using a pre-programmed microcontroller to receive the DC electrical signal and responsively perform the precluding step.

12. The method of claim 11, wherein:
the pre-programmed microcontroller has a power input and a power output, and
the step of using a pre-programmed microcontroller includes a step of operatively connecting the power input and the power output to the AC electrical power circuit.

13. The method of claim 12, wherein:
the AC electrical power circuit has a normally open relay therein, and
the step of operatively connecting includes a step of operatively connecting the power output of the pre-programmed microcontroller to the normally open relay.

14. A method of testing an electric heating element for a dry fire condition, the method comprising steps of:

coupling a dry fire protection circuit to the electric heating element;
powering the electric heating element with a plurality of electrical test pulses having first time periods and being separated by second time periods;
determining a first average of a representative value corresponding to a first electrical current flow through the electric heating element during one of the electrical test pulses;
determining a second average of a representative value corresponding to a second electrical current flow through the electric heating element during another one of the electrical test pulses; and
precluding operative energization of the electric heating element if the first average is less than the second average by a predetermined amount.

15. The method of claim 14, further comprising depowering the electric heating element during the second time periods.

16. The method of claim 14, further comprising disposing the electric heating element in an electric water heater tank operative to store a quantity of water to be heated.

17. The method of claim 14, wherein:
the electric heating element is incorporated in a liquid heating apparatus having an AC electrical power circuit in which the electric heating element and a relay are operatively connected, and
the powering step includes alternately opening and closing the relay.

18. The method of claim 14, wherein:
the powering step is performed using AC electrical power, and
the determining steps include a step of utilizing AC electrical power to create a DC electrical signal indicative of the first and second averages of the representative values corresponding to the first and second electrical current flows through the electric heating element during the electrical test pulses.

19. The method of claim 18, wherein:
the AC electrical power is supplied from an AC electrical power circuit, and
the step of utilizing includes a step of coupling to the AC electrical power circuit to a signal conditioning circuit operative to output the DC electrical signal.

20. The method of claim 19, wherein:
the coupling step is performed using a step-down current transformer.

* * * * *